(12) United States Patent
Rhoads et al.

(10) Patent No.: US 8,483,426 B2
(45) Date of Patent: Jul. 9, 2013

(54) DIGITAL WATERMARKS

(75) Inventors: Geoffrey B. Rhoads, West Linn, OR (US); J. Scott Carr, Los Gatos, CA (US)

(73) Assignee: Digimarc Corporation, Beaverton, OR (US)

( * ) Notice: Subject to any disclaimer, the term of this patent is extended or adjusted under 35 U.S.C. 154(b) by 336 days.

(21) Appl. No.: 12/881,911

(22) Filed: Sep. 14, 2010

(65) Prior Publication Data

US 2011/0058707 A1    Mar. 10, 2011

Related U.S. Application Data

(60) Continuation of application No. 11/846,449, filed on Aug. 28, 2007, now Pat. No. 7,796,826, which is a continuation of application No. 10/379,393, filed on Mar. 3, 2003, now Pat. No. 7,263,203, which is a continuation of application No. 09/292,569, filed on Apr. 15, 1999, now abandoned, said application No. 10/379,393 is a continuation of application No. 09/998,763, filed on Nov. 29, 2001, now Pat. No. 6,738,495, which is a division of application No. 09/292,569, filed on Apr. 15, 1999, now abandoned, said application No. 10/379,393 is a continuation-in-part of application No. 09/186,962, filed on Nov. 5, 1998, now Pat. No. 7,171,016, which is a continuation of application No. 08/649,419, filed on May 16, 1996, now Pat. No. 5,862,260, which is a continuation of application No. PCT/US96/06618, filed on May 7, 1996.

(60) Provisional application No. 60/082,228, filed on Apr. 16, 1998.

(51) Int. Cl.
*G06K 9/00* (2006.01)

(52) U.S. Cl.
USPC .......................................... 382/100; 382/232

(58) Field of Classification Search
USPC ................................................. 382/100, 232
See application file for complete search history.

(56) References Cited

U.S. PATENT DOCUMENTS 5,079,648 A * 1/1992 Maufe ............................ 360/31
5,448,053 A 9/1995 Rhoads (Continued)

FOREIGN PATENT DOCUMENTS

| WO | WO 95/14289 | 5/1995 |
| WO | WO 96/36163 | 11/1996 |
| WO | WO 97/43736 | 11/1997 |

OTHER PUBLICATIONS

U.S. Appl. No. 08/154,866, filed Nov. 18, 1993, Geoffrey B. Rhoads.

(Continued)

*Primary Examiner* — Wesley Tucker

(57) ABSTRACT

The present invention relates generally to information encoding, data hiding, steganography and digital watermarking. One claim recites: using a programmed electronic processor, encoding content with a plural-bit digital watermark in accordance with initial encoding parameters; determining an assessment of the encoded plural-bit digital watermark in each of two or more portions of the content; for each of the two or more portions of the content, adjusting at least one of the initial encoding parameters according to a determined assessment for a respective portion of the content; and using a programmed electronic processor, encoding the content with said plural-bit watermark in accordance with adjusted encoding parameters. Other claims are provided as well.

30 Claims, 8 Drawing Sheets

U.S. PATENT DOCUMENTS

| | | |
|---|---|---|
| 5,481,294 A | 1/1996 | Thomas et al. |
| 5,574,962 A | 11/1996 | Fardeau et al. |
| 5,579,124 A | 11/1996 | Aijala et al. |
| 5,612,943 A | 3/1997 | Moses et al. |
| 5,613,004 A | 3/1997 | Cooperman et al. |
| 5,687,236 A | 11/1997 | Moskowitz et al. |
| 5,710,834 A | 1/1998 | Rhoads |
| 5,721,788 A | 2/1998 | Powell et al. |
| 5,734,752 A | 3/1998 | Knox |
| 5,745,604 A | 4/1998 | Rhoads |
| 5,748,763 A | 5/1998 | Rhoads |
| 5,768,426 A | 6/1998 | Rhoads |
| 5,790,703 A | 8/1998 | Wang |
| 5,809,139 A | 9/1998 | Girod et al. |
| 5,825,892 A | 10/1998 | Braudaway et al. |
| 5,832,119 A | 11/1998 | Rhoads |
| 5,841,886 A | 11/1998 | Rhoads |
| 5,841,978 A | 11/1998 | Rhoads |
| 5,848,155 A | 12/1998 | Cox |
| 5,850,481 A | 12/1998 | Rhoads |
| 5,862,260 A | 1/1999 | Rhoads |
| 5,875,249 A | 2/1999 | Mintzer et al. |
| 5,930,377 A | 7/1999 | Powell et al. |
| 5,933,798 A | 8/1999 | Linnartz |
| 5,949,055 A | 9/1999 | Fleet et al. |
| 6,026,193 A | 2/2000 | Rhoads |
| 6,035,177 A | 3/2000 | Moses et al. |
| 6,088,123 A | 7/2000 | Adler et al. |
| 6,101,602 A | 8/2000 | Fridrich |
| 6,108,434 A | 8/2000 | Cox et al. |
| 6,122,392 A | 9/2000 | Rhoads |
| 6,122,403 A | 9/2000 | Rhoads |
| 6,128,736 A | 10/2000 | Miller |
| 6,131,161 A | 10/2000 | Linnartz |
| 6,157,330 A | 12/2000 | Bruekers et al. |
| 6,163,842 A | 12/2000 | Barton |
| 6,198,832 B1 | 3/2001 | Maes et al. |
| 6,205,249 B1 | 3/2001 | Moskowitz |
| 6,208,745 B1 | 3/2001 | Florencio et al. |
| 6,219,634 B1 | 4/2001 | Levine |
| 6,222,932 B1 | 4/2001 | Rao et al. |
| 6,229,924 B1 | 5/2001 | Rhoads et al. |
| 6,233,347 B1 | 5/2001 | Chen et al. |
| 6,252,972 B1 | 6/2001 | Linnartz |
| 6,256,736 B1 | 7/2001 | Coppersmith et al. |
| 6,266,430 B1 | 7/2001 | Rhoads |
| 6,285,776 B1 | 9/2001 | Rhoads |
| 6,286,036 B1 | 9/2001 | Rhoads |
| 6,289,108 B1 | 9/2001 | Rhoads |
| 6,307,949 B1 | 10/2001 | Rhoads |
| 6,311,214 B1 | 10/2001 | Rhoads |
| 6,320,965 B1 | 11/2001 | Levine |
| 6,324,573 B1 | 11/2001 | Rhoads |
| 6,330,335 B1 | 12/2001 | Rhoads |
| 6,332,194 B1 | 12/2001 | Bloom et al. |
| 6,343,138 B1 | 1/2002 | Rhoads |
| 6,345,104 B1 | 2/2002 | Rhoads |
| 6,353,672 B1 | 3/2002 | Rhoads |
| 6,363,159 B1 | 3/2002 | Rhoads |
| 6,381,341 B1 | 4/2002 | Rhoads |
| 6,385,329 B1 | 5/2002 | Sharma et al. |
| 6,389,151 B1 | 5/2002 | Carr et al. |
| 6,400,827 B1 | 6/2002 | Rhoads |
| 6,404,898 B1 | 6/2002 | Rhoads |
| 6,408,082 B1 | 6/2002 | Rhoads et al. |
| 6,408,331 B1 | 6/2002 | Rhoads |
| 6,411,725 B1 | 6/2002 | Rhoads |
| 6,415,041 B1 | 7/2002 | Oami et al. |
| 6,421,070 B1 | 7/2002 | Ramos et al. |
| 6,424,725 B1 | 7/2002 | Rhoads et al. |
| 6,430,302 B2 | 8/2002 | Rhoads |
| 6,449,377 B1 | 9/2002 | Rhoads |
| 6,449,379 B1 | 9/2002 | Rhoads |
| 6,456,727 B1 | 9/2002 | Echizen et al. |
| 6,496,591 B1 | 12/2002 | Rhoads |
| 6,516,079 B1 | 2/2003 | Rhoads et al. |
| 6,519,352 B2 | 2/2003 | Rhoads |
| 6,522,767 B1 | 2/2003 | Moskowitz et al. |
| 6,522,770 B1 | 2/2003 | Seder et al. |
| 6,522,771 B2 | 2/2003 | Rhoads |
| 6,535,617 B1 | 3/2003 | Hannigan et al. |
| 6,535,618 B1 | 3/2003 | Rhoads |
| 6,539,095 B1 | 3/2003 | Rhoads |
| 6,542,618 B1 | 4/2003 | Rhoads |
| 6,542,620 B1 | 4/2003 | Rhoads |
| 6,542,927 B2 | 4/2003 | Rhoads |
| 6,546,112 B1 | 4/2003 | Rhoads |
| 6,546,113 B1 | 4/2003 | Lucas et al. |
| 6,553,129 B1 | 4/2003 | Rhoads |
| 6,560,349 B1 | 5/2003 | Rhoads |
| 6,560,350 B2 | 5/2003 | Rhoads |
| 6,567,533 B1 | 5/2003 | Rhoads |
| 6,567,534 B1 | 5/2003 | Rhoads |
| 6,567,535 B2 | 5/2003 | Rhoads |
| 6,567,780 B2 | 5/2003 | Rhoads |
| 6,574,350 B1 | 6/2003 | Rhoads et al. |
| 6,580,808 B2 | 6/2003 | Rhoads |
| 6,580,819 B1 | 6/2003 | Rhoads |
| 6,587,821 B1 | 7/2003 | Rhoads |
| 6,590,996 B1 | 7/2003 | Reed et al. |
| 6,590,997 B2 | 7/2003 | Rhoads |
| 6,590,998 B2 | 7/2003 | Rhoads |
| 6,611,607 B1 | 8/2003 | Davis et al. |
| 6,614,914 B1 | 9/2003 | Rhoads et al. |
| 6,647,128 B1 | 11/2003 | Rhoads |
| 6,647,129 B2 | 11/2003 | Rhoads |
| 6,647,130 B2 | 11/2003 | Rhoads |
| 6,650,761 B1 | 11/2003 | Rodriguez et al. |
| 6,654,480 B2 | 11/2003 | Rhoads |
| 6,654,887 B2 | 11/2003 | Rhoads |
| 6,674,873 B1 * | 1/2004 | Donescu et al. ............. 382/100 |
| 6,675,146 B2 | 1/2004 | Rhoads |
| 6,681,028 B2 | 1/2004 | Rodriguez et al. |
| 6,681,029 B1 | 1/2004 | Rhoads |
| 6,694,042 B2 | 2/2004 | Seder et al. |
| 6,694,043 B2 | 2/2004 | Seder et al. |
| 6,700,990 B1 | 3/2004 | Rhoads |
| 6,700,995 B2 | 3/2004 | Reed |
| 6,704,869 B2 | 3/2004 | Rhoads et al. |
| 6,718,046 B2 | 4/2004 | Reed et al. |
| 6,718,047 B2 | 4/2004 | Rhoads |
| 6,721,440 B2 | 4/2004 | Reed et al. |
| 6,724,912 B1 | 4/2004 | Carr et al. |
| 6,738,495 B2 | 5/2004 | Rhoads et al. |
| 6,744,907 B2 | 6/2004 | Rhoads |
| 6,750,985 B2 | 6/2004 | Rhoads |
| 6,754,377 B2 | 6/2004 | Rhoads |
| 6,757,406 B2 | 6/2004 | Rhoads |
| 6,760,463 B2 | 7/2004 | Rhoads |
| 6,763,123 B2 | 7/2004 | Reed et al. |
| 6,768,808 B2 | 7/2004 | Rhoads |
| 6,768,809 B2 | 7/2004 | Rhoads et al. |
| 6,771,796 B2 | 8/2004 | Rhoads |
| 6,775,392 B1 | 8/2004 | Rhoads |
| 6,778,682 B2 | 8/2004 | Rhoads |
| 6,792,542 B1 | 9/2004 | Lee et al. |
| 6,798,894 B2 | 9/2004 | Rhoads |
| 6,804,378 B2 | 10/2004 | Rhoads |
| 6,804,379 B2 | 10/2004 | Rhoads |
| 6,813,366 B1 | 11/2004 | Rhoads |
| 6,879,701 B1 | 4/2005 | Rhoads |
| 6,882,738 B2 | 4/2005 | Davis et al. |
| 6,917,724 B2 | 7/2005 | Seder et al. |
| 6,920,232 B2 | 7/2005 | Rhoads |
| 6,944,298 B1 | 9/2005 | Rhoads |
| 6,947,571 B1 | 9/2005 | Rhoads et al. |
| 6,959,100 B2 | 10/2005 | Rhoads |
| 6,959,386 B2 | 10/2005 | Rhoads |
| 6,970,573 B2 | 11/2005 | Carr et al. |
| 6,975,746 B2 | 12/2005 | Davis et al. |
| 6,978,036 B2 | 12/2005 | Alattar et al. |
| 6,983,051 B1 | 1/2006 | Rhoads |
| 6,987,862 B2 | 1/2006 | Rhoads |
| 6,988,202 B1 | 1/2006 | Rhoads et al. |
| 6,993,152 B2 | 1/2006 | Patterson et al. |
| 6,996,252 B2 | 2/2006 | Reed et al. |
| 7,003,132 B2 | 2/2006 | Rhoads |

| | | | | | | |
|---|---|---|---|---|---|---|
| 7,003,731 B1 | 2/2006 | Rhoads et al. | | 7,502,759 B2 | 3/2009 | Hannigan et al. |
| 7,006,661 B2 | 2/2006 | Miller et al. | | 7,508,955 B2 | 3/2009 | Carr et al. |
| 7,016,516 B2 | 3/2006 | Rhoads | | 7,515,733 B2 | 4/2009 | Rhoads |
| 7,024,016 B2 | 4/2006 | Rhoads et al. | | 7,532,741 B2 | 5/2009 | Stach |
| 7,027,614 B2 | 4/2006 | Reed | | 7,536,034 B2 | 5/2009 | Rhoads et al. |
| 7,031,491 B1 | 4/2006 | Donescu et al. | | 7,536,555 B2 | 5/2009 | Rhoads |
| 7,035,427 B2 | 4/2006 | Rhoads | | 7,537,170 B2 | 5/2009 | Reed et al. |
| 7,043,052 B2 | 5/2006 | Rhoads | | 7,539,325 B2 | 5/2009 | Rhoads et al. |
| 7,044,395 B1 | 5/2006 | Davis et al. | | 7,545,952 B2 | 6/2009 | Brundage et al. |
| 7,046,808 B1 | 5/2006 | Metois et al. | | 7,548,643 B2 | 6/2009 | Davis et al. |
| 7,050,603 B2 | 5/2006 | McKiney et al. | | 7,555,139 B2 | 6/2009 | Rhoads et al. |
| 7,051,086 B2 | 5/2006 | Rhoads et al. | | 7,564,992 B2 | 7/2009 | Rhoads |
| 7,054,462 B2 | 5/2006 | Rhoads et al. | | 7,567,686 B2 | 7/2009 | Rhoads |
| 7,054,463 B2 | 5/2006 | Rhoads et al. | | 7,570,784 B2 | 8/2009 | Alattar |
| 7,054,465 B2 | 5/2006 | Rhoads | | 7,577,273 B2 | 8/2009 | Rhoads et al. |
| 7,058,697 B2 | 6/2006 | Rhoads | | RE40,919 E | 9/2009 | Rhoads |
| 7,062,069 B2 | 6/2006 | Rhoads | | 7,602,940 B2 | 10/2009 | Rhoads et al. |
| 7,076,084 B2 | 7/2006 | Davis et al. | | 7,602,977 B2 | 10/2009 | Rhoads et al. |
| 7,095,871 B2 | 8/2006 | Jones et al. | | 7,602,978 B2 | 10/2009 | Levy et al. |
| 7,111,170 B2 | 9/2006 | Rhoads et al. | | 7,606,390 B2 | 10/2009 | Rhoads |
| 7,113,614 B2 | 9/2006 | Rhoads | | 7,616,777 B2 | 11/2009 | Rodriguez et al. |
| 7,113,615 B2 | 9/2006 | Rhoads et al. | | 7,620,200 B2 | 11/2009 | Rhoads |
| 7,130,087 B2 | 10/2006 | Rhoads | | 7,620,253 B2 | 11/2009 | Miller et al. |
| 7,139,408 B2 | 11/2006 | Rhoads et al. | | 7,628,320 B2 | 12/2009 | Rhoads |
| 7,142,691 B2 | 11/2006 | Levy | | 7,639,837 B2 | 12/2009 | Carr et al. |
| 7,158,654 B2 | 1/2007 | Rhoads | | 7,643,649 B2 | 1/2010 | Davis et al. |
| 7,164,780 B2 | 1/2007 | Brundage et al. | | 7,650,009 B2 | 1/2010 | Rhoads |
| 7,171,016 B1 | 1/2007 | Rhoads | | 7,653,210 B2 | 1/2010 | Rhoads |
| 7,174,031 B2 | 2/2007 | Rhoads et al. | | 7,657,058 B2 | 2/2010 | Sharma |
| 7,177,443 B2 | 2/2007 | Rhoads | | 7,672,477 B2 | 3/2010 | Rhoads |
| 7,181,022 B2 | 2/2007 | Rhoads | | 7,672,843 B2 | 3/2010 | Srinivasan et al. |
| 7,184,570 B2 | 2/2007 | Rhoads | | 7,676,059 B2 | 3/2010 | Rhoads |
| 7,213,757 B2 | 5/2007 | Jones et al. | | 7,685,426 B2 | 3/2010 | Ramos et al. |
| 7,224,819 B2 | 5/2007 | Levy et al. | | 7,693,300 B2 | 4/2010 | Reed et al. |
| 7,231,061 B2 | 6/2007 | Bradley | | 7,693,965 B2 | 4/2010 | Rhoads |
| 7,239,734 B2 | 7/2007 | Alattar et al. | | 7,697,719 B2 | 4/2010 | Rhoads |
| 7,242,790 B2 | 7/2007 | Rhoads | | 7,702,511 B2 | 4/2010 | Rhoads |
| 7,248,717 B2 | 7/2007 | Rhoads | | 7,711,143 B2 | 5/2010 | Rhoads |
| 7,261,612 B1 | 8/2007 | Hannigan et al. | | 7,720,249 B2 | 5/2010 | Rhoads |
| 7,263,203 B2 | 8/2007 | Rhoads et al. | | 7,720,255 B2 | 5/2010 | Rhoads |
| 7,266,217 B2 | 9/2007 | Rhoads et al. | | 7,724,919 B2 | 5/2010 | Rhoads |
| 7,269,275 B2 | 9/2007 | Carr et al. | | 7,724,920 B2 | 5/2010 | Rhoads |
| 7,286,684 B2 | 10/2007 | Rhoads et al. | | 7,738,673 B2 | 6/2010 | Reed |
| 7,305,104 B2 | 12/2007 | Carr et al. | | 7,747,038 B2 | 6/2010 | Rhoads |
| 7,305,117 B2 | 12/2007 | Davis et al. | | 7,751,588 B2 | 7/2010 | Rhoads |
| 7,308,110 B2 | 12/2007 | Rhoads | | 7,751,596 B2 | 7/2010 | Rhoads |
| 7,313,251 B2 | 12/2007 | Rhoads | | 7,756,290 B2 | 7/2010 | Rhoads |
| 7,313,253 B2 | 12/2007 | Davis et al. | | 7,760,905 B2 | 7/2010 | Rhoads et al. |
| 7,319,775 B2 | 1/2008 | Sharma et al. | | 7,762,468 B2 | 7/2010 | Reed et al. |
| 7,321,667 B2 | 1/2008 | Stach | | 7,770,013 B2 | 8/2010 | Rhoads et al. |
| 7,330,563 B2 | 2/2008 | Rhoads | | 7,787,653 B2 | 8/2010 | Rhoads |
| 7,330,564 B2 | 2/2008 | Brundage et al. | | 7,792,325 B2 | 9/2010 | Rhoads et al. |
| 7,340,076 B2 | 3/2008 | Stach et al. | | 7,796,826 B2 | 9/2010 | Rhoads et al. |
| 7,346,184 B1 | 3/2008 | Carr et al. | | 7,805,500 B2 | 9/2010 | Rhoads |
| 7,349,555 B2 | 3/2008 | Rhoads | | 7,822,225 B2 | 10/2010 | Alattar |
| 7,359,528 B2 | 4/2008 | Rhoads | | 7,831,062 B2 | 11/2010 | Stach |
| 7,369,678 B2 | 5/2008 | Rhoads | | 7,837,094 B2 | 11/2010 | Rhoads |
| 7,372,976 B2 | 5/2008 | Rhoads et al. | | 7,916,354 B2 | 3/2011 | Rhoads |
| 7,377,421 B2 | 5/2008 | Rhoads | | 7,936,900 B2 | 5/2011 | Rhoads |
| 7,391,880 B2 | 6/2008 | Reed et al. | | 2001/0002931 A1 | 6/2001 | Maes et al. |
| 7,406,214 B2 | 7/2008 | Rhoads et al. | | 2001/0020270 A1 | 9/2001 | Yeung et al. |
| 7,415,129 B2 | 8/2008 | Rhoads | | 2001/0022848 A1 | 9/2001 | Rhoads |
| 7,418,111 B2 | 8/2008 | Rhoads | | 2001/0029580 A1 | 10/2001 | Mowkowitz |
| 7,424,131 B2 | 9/2008 | Alattar et al. | | 2001/0030769 A1 | 10/2001 | Jacobs |
| 7,424,132 B2 | 9/2008 | Rhoads | | 2001/0033674 A1 | 10/2001 | Chen et al. |
| 7,427,030 B2 | 9/2008 | Jones et al. | | 2001/0034705 A1 | 10/2001 | Rhoads et al. |
| 7,433,491 B2 | 10/2008 | Rhoads | | 2001/0054150 A1 | 12/2001 | Levy |
| 7,436,976 B2 | 10/2008 | Levy et al. | | 2001/0055407 A1 | 12/2001 | Rhoads |
| 7,437,430 B2 | 10/2008 | Rhoads | | 2002/0009208 A1 | 1/2002 | Alattar et al. |
| 7,444,000 B2 | 10/2008 | Rhoads | | 2002/0016916 A1 | 2/2002 | Natarajan |
| 7,444,392 B2 | 10/2008 | Rhoads et al. | | 2002/0021823 A1 | 2/2002 | Muratani |
| 7,450,734 B2 | 11/2008 | Rodriguez et al. | | 2002/0023020 A1 | 2/2002 | Kenyon et al. |
| 7,454,035 B2 | 11/2008 | Miller et al. | | 2002/0029338 A1 | 3/2002 | Bloom et al. |
| 7,460,667 B2 | 12/2008 | Lee et al. | | 2002/0051560 A1 | 5/2002 | Donescu et al. |
| 7,460,726 B2 | 12/2008 | Levy et al. | | 2002/0080995 A1 | 6/2002 | Rhoads |
| 7,461,136 B2 | 12/2008 | Rhoads | | 2002/0097892 A1 | 7/2002 | Oami et al. |
| 7,466,840 B2 | 12/2008 | Rhoads | | 2002/0124174 A1 | 9/2002 | Ehrmann-Patin et al. |
| 7,486,799 B2 | 2/2009 | Rhoads | | 2002/0131076 A1 | 9/2002 | Davis |
| 7,499,564 B2 | 3/2009 | Rhoads | | 2002/0136429 A1 | 9/2002 | Stach et al. |

| | | |
|---|---|---|
| 2002/0176003 A1 | 11/2002 | Seder et al. |
| 2002/0186886 A1 | 12/2002 | Rhoads |
| 2002/0196272 A1 | 12/2002 | Ramos et al. |
| 2003/0021440 A1 | 1/2003 | Rhoads |
| 2003/0040957 A1 | 2/2003 | Rodriguez et al. |
| 2003/0105730 A1 | 6/2003 | Davis et al. |
| 2003/0130954 A1 | 7/2003 | Carr et al. |
| 2003/0138128 A1 | 7/2003 | Rhoads |
| 2004/0005093 A1 | 1/2004 | Rhoads |
| 2004/0057581 A1 | 3/2004 | Rhoads |
| 2004/0181671 A1 | 9/2004 | Brundage et al. |
| 2004/0184369 A1 | 9/2004 | Herre et al. |
| 2004/0190750 A1 | 9/2004 | Rodriguez et al. |
| 2004/0240704 A1 | 12/2004 | Reed |
| 2004/0263911 A1 | 12/2004 | Rodriguez et al. |
| 2004/0264733 A1 | 12/2004 | Rhoads et al. |
| 2005/0013462 A1 | 1/2005 | Rhoads |
| 2005/0041835 A1 | 2/2005 | Reed et al. |
| 2005/0058318 A1 | 3/2005 | Rhoads |
| 2005/0192933 A1 | 9/2005 | Rhoads et al. |
| 2005/0249374 A1 | 11/2005 | Levy |
| 2006/0013435 A1 | 1/2006 | Rhoads |
| 2006/0028689 A1 | 2/2006 | Perry et al. |
| 2006/0041591 A1 | 2/2006 | Rhoads |
| 2006/0062386 A1 | 3/2006 | Rhoads |
| 2006/0171559 A1 | 8/2006 | Rhoads |
| 2006/0251291 A1 | 11/2006 | Rhoads |
| 2007/0016790 A1 | 1/2007 | Brundage et al. |
| 2007/0055884 A1 | 3/2007 | Rhoads |
| 2007/0108287 A1 | 5/2007 | Davis et al. |
| 2007/0154064 A1 | 7/2007 | Rhoads et al. |
| 2007/0172098 A1 | 7/2007 | Rhoads et al. |
| 2007/0180251 A1 | 8/2007 | Carr et al. |
| 2007/0201835 A1 | 8/2007 | Rhoads |
| 2007/0276841 A1 | 11/2007 | Rhoads et al. |
| 2007/0276928 A1 | 11/2007 | Rhoads et al. |
| 2008/0121728 A1 | 5/2008 | Rodriguez |
| 2008/0131083 A1 | 6/2008 | Rhoads |
| 2008/0131084 A1 | 6/2008 | Rhoads |
| 2008/0133555 A1 | 6/2008 | Rhoads et al. |
| 2008/0149713 A1 | 6/2008 | Brundage |
| 2008/0181450 A1 | 7/2008 | Carr et al. |
| 2008/0253740 A1 | 10/2008 | Rhoads |
| 2008/0275906 A1 | 11/2008 | Rhoads et al. |
| 2008/0292134 A1 | 11/2008 | Sharma et al. |
| 2009/0012944 A1 | 1/2009 | Rodriguez et al. |
| 2009/0116687 A1 | 5/2009 | Rhoads et al. |
| 2009/0125475 A1 | 5/2009 | Rhoads et al. |
| 2009/0129627 A1 | 5/2009 | Levy et al. |
| 2009/0172128 A1 | 7/2009 | Rhoads |
| 2009/0232352 A1 | 9/2009 | Carr et al. |
| 2009/0252401 A1 | 10/2009 | Davis et al. |
| 2009/0262975 A1 | 10/2009 | Rhoads et al. |
| 2009/0286572 A1 | 11/2009 | Rhoads et al. |
| 2009/0290754 A1 | 11/2009 | Rhoads |
| 2010/0008534 A1 | 1/2010 | Rhoads |
| 2010/0008536 A1 | 1/2010 | Rhoads |
| 2010/0008537 A1 | 1/2010 | Rhoads |
| 2010/0021004 A1 | 1/2010 | Rhoads |
| 2010/0027837 A1 | 2/2010 | Levy et al. |
| 2010/0027969 A1 | 2/2010 | Alattar |
| 2010/0045816 A1 | 2/2010 | Rhoads |
| 2010/0062819 A1 | 3/2010 | Hannigan et al. |
| 2010/0067737 A1 | 3/2010 | Miller et al. |
| 2010/0094639 A1 | 4/2010 | Rhoads |
| 2010/0119108 A1 | 5/2010 | Rhoads |
| 2010/0128924 A1 | 5/2010 | Rhoads |
| 2010/0131767 A1 | 5/2010 | Rhoads |
| 2010/0142749 A1 | 6/2010 | Ellingson et al. |
| 2010/0142752 A1 | 6/2010 | Rhoads et al. |
| 2010/0146285 A1 | 6/2010 | Rhoads et al. |
| 2010/0163629 A1 | 7/2010 | Rhoads et al. |
| 2010/0172540 A1 | 7/2010 | Davis et al. |
| 2010/0198941 A1 | 8/2010 | Rhoads |
| 2011/0007936 A1 | 1/2011 | Rhoads |
| 2011/0026777 A1 | 2/2011 | Rhoads et al. |
| 2011/0040780 A1 | 2/2011 | Rhoads |
| 2011/0051998 A1 | 3/2011 | Rhoads |
| 2011/0062229 A1 | 3/2011 | Rhoads |
| 2011/0066734 A1 | 3/2011 | Rhoads |
| 2011/0091066 A1 | 4/2011 | Alattar |

OTHER PUBLICATIONS

U.S. Appl. No. 08/215,289, filed Mar. 17, 1994, Geoffrey B. Rhoads.
U.S. Appl. No. 08/512,993, filed Aug. 9, 1995, Geoffrey B. Rhoads.
U.S. Appl. No. 09/150,147, filed Sep. 9, 1998, Geoffrey B. Rhoads.
U.S. Appl. No. 09/151,492, filed Sep. 11, 1998, Bruce L. Davis, et al.
U.S. Appl. No. 09/343,104, filed Jun. 29, 1999, Tony F. Rodriguez, et al.
U.S. Appl. No. 09/343,101, filed Jun. 29, 1999, Bruce L. Davis, et al.
U.S. Appl. No. 09/413,117, filed Oct. 6, 1999, Geoffrey B. Rhoads.
U.S. Appl. No. 09/482,749, filed Jan. 13, 2000, Geoffrey B. Rhoads.
U.S. Appl. No. 09/496,380, filed Feb. 2, 2000, Geoffrey B. Rhoads.
U.S. Appl. No. 09/507,096, filed Feb. 17, 2000, Geoffrey B. Rhoads, et al.
U.S. Appl. No. 09/538,493, filed Mar. 30, 2000, Geoffrey B. Rhoads.
U.S. Appl. No. 09/552,998, filed Apr. 19, 2000, Tony F. Rodriguez, et al.
U.S. Appl. No. 09/567,405, filed May 8, 2000, Geoffrey B. Rhoads, et al.
U.S. Appl. No. 09/629,649, filed Aug. 1, 2000, J. Scott Carr, et al.
U.S. Appl. No. 09/633,587, filed Aug. 7, 2000, Geoffrey B. Rhoads, et al.
U.S. Appl. No. 09/689,289, filed Oct. 11, 2000, Geoffrey B. Rhoads, et al.
U.S. Appl. No. 09/697,009, filed Oct. 25, 2000, Bruce L. Davis, et al.
U.S. Appl. No. 09/697,015, filed Oct. 25, 2000, Bruce L Davis, et al.
U.S. Appl. No. 12/942,735, filed Nov. 9, 2010, John Stach.
U.S. Appl. No. 13/084,981, Apr. 12, 2011, Geoffrey B. Rhoads.
U.S. Appl. No. 13/089,816, filed Apr. 19, 2011, Geoffrey B. Rhoads, et al.
Bender et al., "Techniques for data hiding," Proc. SPIE, vol. 2420, pp. 164-173, 1995.
Boney et al., "Digital Watermarks for Audio Signal", IEEE 1996, pp. 473-480.
Bruckstein et al., "A Holographic Transform Domain Image Watermarking Method," Circuits, Systems and Signal Processing, vol. 17, No. 3, pp. 361-389, 1998.
Hartung, et al., Watermarking of MPEG-2 encoded video without decoding and re-encoding, SPIE Vo. 3020, pp. 264-274.
Hartung, et al., "Watermarking of uncompressed and compressed video," Signal Processing, vol. 66, No. 3, pp. 283-301, May 1998.
Hartung et al., Digital Watermarking of Raw and Compressed Video, Proc. SPIE 2952, Digital Compression Technologies and Systems for Video Communications, Oct. 1996, pp. 205-213.
Miller et al., "Informed Embedding: Exploiting Image and Detector Information During Watermark Insertion," 2000 IEEE, ICIP-2000, Sep. 10-13, 2000, 5 pages.
Puate et al., "Using Fractal Compression Scheme to Embed a Digital Signature Into and Image," *SPIE* vol. 2915, Mar. 1997, pp. 108-118.
Stone, Analysis of Attacks on Image Watermarks with Randomized Coefficients, May 17, 1996.
Koch et al, "Copyright Protection for Multimedia Data," Proc. of the Int. Conf. on Digital Media and Electronic Publishing, Leeds, U.K., 15 pages, Dec. 1994.

* cited by examiner

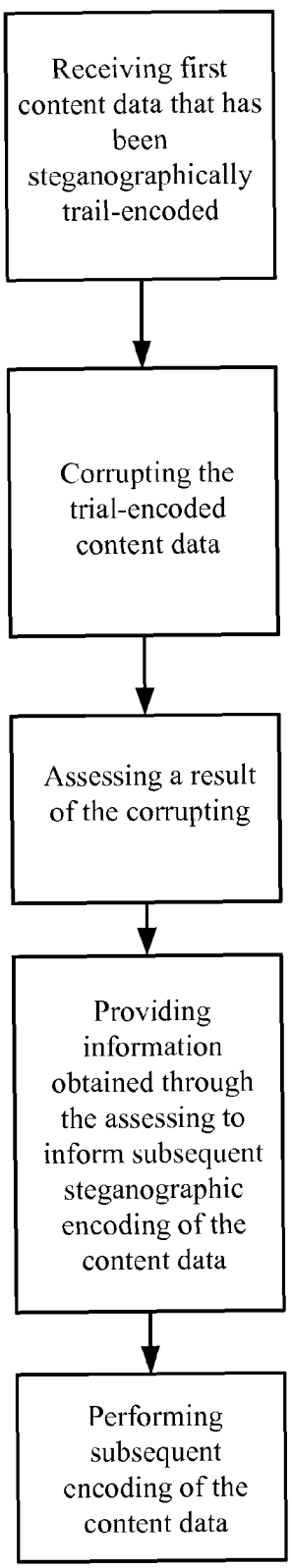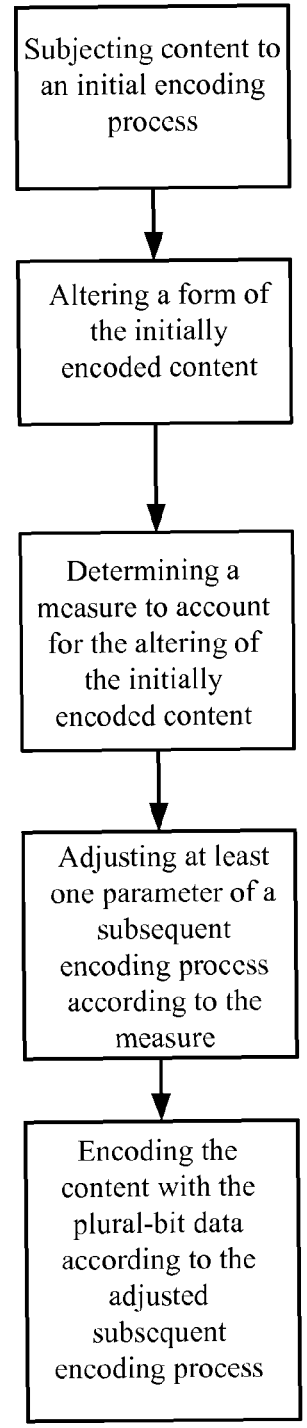
FIG. 14
FIG. 15

DIGITAL WATERMARKS

CROSS-REFERENCE TO RELATED APPLICATIONS

This application is a continuation of application Ser. No. 11/846,449, filed Aug. 28, 2007 (now U.S. Pat. No. 7,796,826), which is a continuation of application Ser. No. 10/379,393, filed Mar. 3, 2003 (now U.S. Pat. No. 7,263,203) which is a continuation of application Ser. No. 09/292,569, filed Apr. 15, 1999, which claims benefit of provisional application 60/082,228, filed Apr. 16, 1998.

Application Ser. No. 10/379,393 is also a continuation of application Ser. No. 09/998,763, filed Nov. 29, 2001 (now U.S. Pat. No. 6,738,495), which is a division of application Ser. No. 09/292,569, filed Apr. 15, 1999, which claims benefit of provisional application 60/082,228, filed Apr. 16, 1998.

Application Ser. No. 10/379,393 is also a continuation-in-part of application Ser. No. 09/186,962, filed Nov. 5, 1998 (now U.S. Pat. No. 7,171,016), which is a continuation of application Ser. No. 08/649,419, filed May 16, 1996 (now U.S. Pat. No. 5,862,260), which is a continuation of application PCT/US96/06618, filed May 7, 1996 (now published as WO9636163).

The Ser. No. 10/379,393 application is also related to application Ser. No. 09/442,440, filed Nov. 17, 1999 (now U.S. Pat. No. 6,542,618), which is a continuation of application Ser. No. 08/951,858, filed Oct. 16, 1997 (now U.S. Pat. No. 6,026,193), which is a continuation of application Ser. No. 08/436,134, filed May 8, 1995 (now U.S. Pat. No. 5,748,763).

FIELD OF THE INVENTION

The present application relates to improvements in the field of digital watermarking.

BACKGROUND AND SUMMARY OF THE INVENTION

Digital watermarking ("watermarking") is a quickly growing field of endeavor, with several different approaches. The present assignee's work is reflected in the earlier-cited related applications, as well as in U.S. Pat. Nos. 5,841,978, 5,768,426, 5,748,783, 5,748,763, 5,745,604, 5,710,834, 5,636,292, 5,721,788, and laid-open PCT applications WO97/43736 and WO99/10837 (corresponding to pending U.S. application Ser. No. 08/746,613 (now U.S. Pat. No. 6,122,403) and Ser. No. 09/138,061). Other work is illustrated by U.S. Pat. Nos. 5,734,752, 5,646,997, 5,659,726, 5,664,018, 5,671,277, 5,687,191, 5,687,236, 5,689,587, 5,568,570, 5,572,247, 5,574,962, 5,579,124, 5,581,500, 5,613,004, 5,629,770, 5,461,426, 5,743,631, 5,488,664, 5,530,759, 5,539,735, 4,943,973, 5,337,361, 5,404,160, 5,404,377, 5,315,098, 5,319,735, 5,337,362, 4,972,471, 5,161,210, 5,243,423, 5,091,966, 5,113,437, 4,939,515, 5,374,976, 4,855,827, 4,876,617, 4,939,515, 4,963,998, 4,969,041, and published foreign applications WO 98/02864, EP 822,550, WO 97/39410, WO 96/36163, GB 2,196,167, EP 777,197, EP 736,860, EP 705,025, EP 766,468, EP 782,322, WO 95/20291, WO 96/26494, WO 96/36935, WO 96/42151, WO 97/22206, WO 97/26733. Some of the foregoing patents relate to visible watermarking techniques. Other visible watermarking techniques (e.g. data glyphs) are described in U.S. Pat. Nos. 5,706,364, 5,689,620, 5,684,885, 5,680,223, 5,668,636, 5,640,647, 5,594,809.

Most of the work in watermarking, however, is not in the patent literature but rather in published research. In addition to the patentees of the foregoing patents, some of the other workers in this field (whose watermark-related writings can by found by an author search in the INSPEC database) include I. Pitas, Eckhard Koch, Jian Zhao, Norishige Morimoto, Laurence Boney, Kineo Matsui, A. Z. Tirkel, Fred Mintzer, B. Macq, Ahmed H. Tewfik, Frederic Jordan, Naohisa Komatsu, and Lawrence O'Gorman.

The artisan is assumed to be familiar with the foregoing prior art.

In the present disclosure it should be understood that references to watermarking encompass not only the assignee's watermarking technology, but can likewise be practiced with any other watermarking technology, such as those indicated above.

The physical manifestation of watermarked information most commonly takes the form of altered signal values, such as slightly changed pixel values, picture luminance, picture colors, DCT coefficients, instantaneous audio amplitudes, etc. However, a watermark can also be manifested in other ways, such as changes in the surface micro-topology of a medium, localized chemical changes (e.g. in photographic emulsions), localized variations in optical density, localized changes in luminescence, etc. Watermarks can also be optically implemented in holograms and conventional paper watermarks.)

In accordance with the present invention, various improvements to digital watermarking are disclosed. For example, an improved watermarking method proceeds on an iterative basis in which the watermark data is encoded in a source signal, the result is then decoded, and the "strengths" of the individual encoded bits are discerned. The watermarking parameters are then adjusted so as to redress any deficiencies determined in the first watermarking operation, and the source signal is re-watermarked—this time with the adjusted parameters. So doing assures reliable detection of all the component bits.

The foregoing and other features and advantages of the present invention will be more readily apparent from the following Detailed Description, which proceeds with reference to the accompanying drawings.

BRIEF DESCRIPTION OF THE DRAWINGS

FIGS. 10-15 are flow charts corresponding to some implementation of the invention.

DETAILED DESCRIPTION

Figure 1:
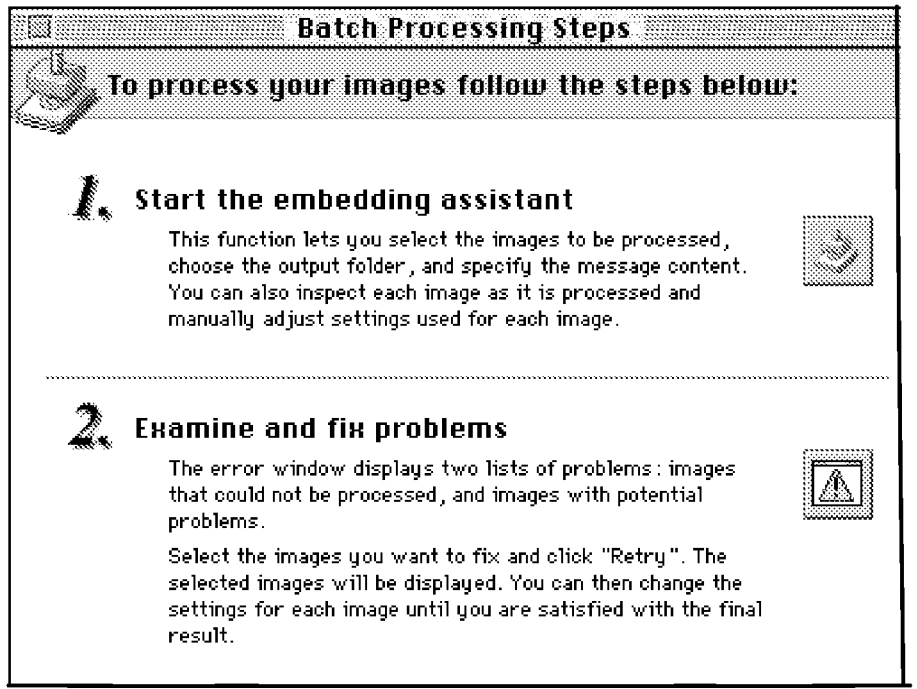
FIGS. 1-9 are screen shots associated with an exemplary embodiment of one aspect of the invention.

An improvement to existing watermark encoding techniques is to add an iterative assessment of the robustness of the mark, with a corresponding adjustment in a re-watermarking operation. Especially when encoding multiple bit watermarks, the characteristics of the underlying content may result in some bits being more robustly (e.g. strongly) encoded than others. In an illustrative technique employing this improvement, a watermark is first embedded in an object. Next, a trial decoding operation is performed. A confidence measure (e.g. signal-to-noise ratio) associated with each bit detected in the decoding operation is then assessed. The bits that appear weakly encoded are identified, and corresponding changes are made to the watermarking parameters to bring up the relative strengths of these bits. The object is then watermarked anew, with the changed parameters. This process can be repeated, as needed, until all of the bits comprising the encoded data are approximately equally detectable from the encoded object, or meet some predetermined signal-to-noise ratio threshold.

While the foregoing analysis evaluated confidence on a per-bit basis, related iterative procedures can evaluate confidence on a per-portion basis. That is, the encoded object is considered in portions, and each portion is analyzed for the robustness of the data encoded thereby. In portions evidencing "weak" encoding, the encoding parameters can be adjusted to strengthen the encoding in one or more subsequent re-encoding operations.

The portions can take different forms, e.g., rectangular patches in a still or moving image; brief temporal excerpts in audio or video; certain DCT/Fourier/wavelet coefficients (or adjoining groups of coefficients) in coefficient-based representations of the object in a transformed domain, etc.

By this technique, even if the encoded object is spatially or temporally excerpted, or filtered (e.g. spectrally), there is increased assurance that the watermark energy remaining after such processing will permit accurate decoding.

In an illustrative embodiment, the process is highly automated and essentially transparent to a user. The user simply instructs a computer-controlled system to watermark an object, and the system responds by performing the trial watermarking, decoding, making successive adjustments, and repeating as necessary until a final encoded object meeting desired watermark-quality requirements is produced.

A more elaborate embodiment is a batch image processing system (implemented, e.g., in software run on a Pentium III-based personal computer system) that successively opens, watermarks, JPEG-compresses, and re-stores each image in a collection of images. Such systems are well-suited for use by proprietors of large image collections (e.g. news agencies, photo stock houses, etc.).

In such systems, any of the foregoing iterative-encoding techniques can be employed. Or other iterative encoding techniques can be used. One other such other iterative encoding technique tests a trial encoding against one or more various forms of corruption, and makes adjustments based on the results of the attempted decoding after such corruption(s). The process repeats as necessary.

In the exemplary system, the image is compressed after watermarking. Compression commonly weakens a watermark since some of the watermark signal components are typically attenuated. The watermark can be made more durable by increasing the watermark's energy, but so doing can have the effect of visibly degrading image quality. Thus, a trade-off must be struck between watermark durability and image fidelity.

A user-interface associated with the system can allow a user to select one of three watermarking modes: low, medium, and high. In the low mode, image quality is more important than watermark durability. (Such encoding is best-suited for applications in which the image is not expected to be corrupted after distribution.) In the medium mode, image quality and watermark durability are about equally important. In the high mode, watermark durability is more important than image quality.

Generally hidden from the user is a watermark intensity parameter—a parameter used by the watermarking algorithm to determine the intensity (e.g. amplitude) of the watermark signal added to the image. In the illustrative system, the parameter has a value between 1 and 16, with 1 representing the lowest-intensity watermark, and 16 representing the highest-intensity watermark. (The actual watermark energy is typically not a linear function of the parameter but can be, e.g., logarithmically related.)

The user interface can also allow the user to specify the degree of JPEG compression desired (e.g. on an arbitrary low/medium/high, or numerically defined scale), and indicate whether the compression can be adjusted—if necessary—to achieve the desired watermark durability/image quality trade-off.

In operation, the system opens the first image file, and sets an initial intensity parameter (i.e. 1 to 16) corresponding to the user's mode selection (low, medium, or high). The resulting watermarked image is then compressed in accordance with the user's instructions. A copy of the compressed file is next made and decompressed. The watermark is then decoded from the decompressed image to check that the watermarked data can be correctly read, and the strength of the watermark signal in the image is assessed.

This strength metric (which may be, e.g., signal-to-noise ratio expressed on a 1-10 scale) indicates the observed durability of the watermark. If the correct watermark was read, the strength metric is then compared against a threshold value corresponding to the selected mode of operation. (I.e. if "low" mode is selected, a relatively low threshold is set on detected strength, whereas if "high" mode is selected, a relatively high threshold is set.)

If the strength of watermark detected in the decompressed image meets or exceeds the corresponding threshold value, the trial watermarking meets the user's objectives. Thus, the compressed/watermarked image is written to a disk or other output storage device. Another file from the collection is read, and the process repeats.

If the strength of the watermark detected in the decompressed image does not meet the corresponding threshold value (or if the correct watermark was not read), the system increases the intensity value and watermarks the original image anew. The watermarked image is again compressed, and a copy made and decompressed. Again, the watermark is decoded from the decompressed image to check for accuracy, and the strength of the watermark signal in the image is assessed.

If the correct watermark was read, and the strength metric meets or exceeds the corresponding threshold, the watermarked/compressed image is written to the output storage device, and the process continues with a new image file.

If the strength of the watermark, or its readability, still don't meet spec, the intensity can be increased again and the process repeated anew. However, at some point, the intensity parameter may reach a value at which the image quality suffers unacceptably. Thus, the different modes of operation (low, medium, and optionally high) have corresponding internal intensity threshold values beyond which the system will not increase. If such threshold is reached, the system will not further increase the embedded watermark intensity. Instead, it will next adjust the compression (if the user has permitted the system—through the UI—this flexibility).

By lowering the degree of compression, encoded watermark energy better persists. An iterative watermark/compress/decompress/decode procedure thus begins in which the compression is successively backed-off until decoding yields a watermark that meets the readability requirement and strength threshold. (In an illustrated embodiment, the intensity remains fixed at the highest level permitted for that mode while this iterative procedure proceeds.)

In some systems, a threshold is set beyond which the degree of compression cannot be lowered (again, for quality concerns). If this threshold is reached, and the decoded watermark still does not meet the readability and strength tests, then the image is set-aside for later manual consideration by the operator, and the process continues anew with the next image. (The same type of exception handling occurs if the user has not permitted the system to adjust the compression, and the strength/readability tests cannot be met with watermark intensity within the permitted range.)

In these iterative systems, processing speed will depend on the size of the increments by which the parameters (e.g. encoding intensity, compression) are successively adjusted. In some embodiments, a fine level of granularity is employed (e.g. changing the intensity by a unit value on successive iterations). In others, larger increments are used. In still others, binary search-type algorithms can be used to hone-in on a nearly-optimal value in a relatively short time.

Figure 2:
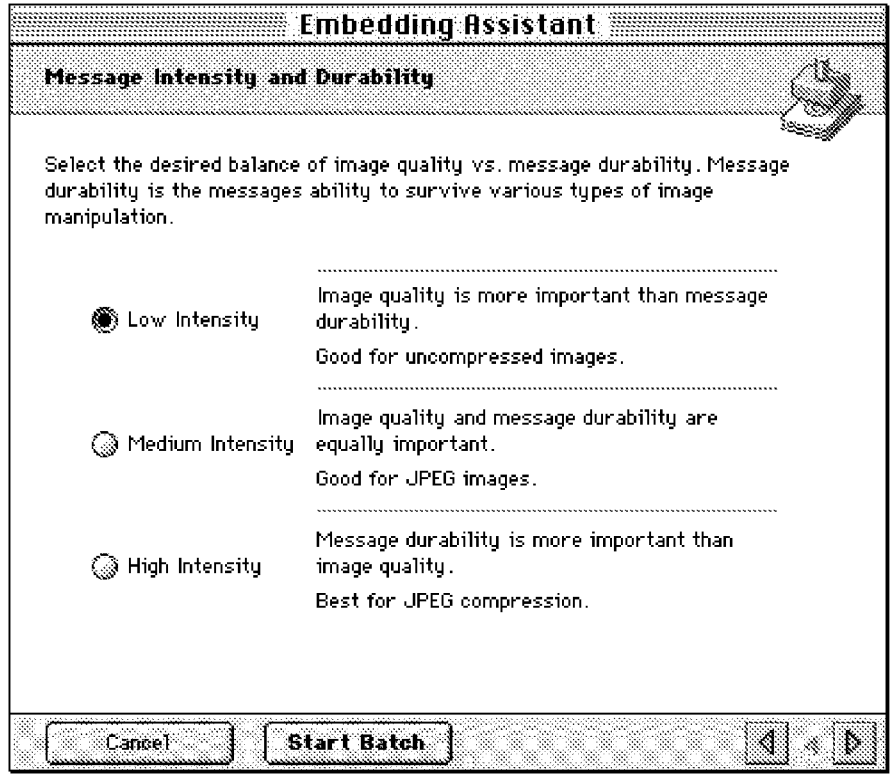

The Figures show illustrative screen shots for use in an embodiment implementing certain of the foregoing features. FIG. 1 shows an initial screen, allowing the user to select between (1) starting the batch embedding; or (2) reviewing exceptions/errors from a previous batch embedding process and taking remedial actions (e.g., per FIG. 9 below). FIG. 2 shows the UI permitting the user to specify the mode of operation desired (i.e., low/medium/high).

Figure 3:
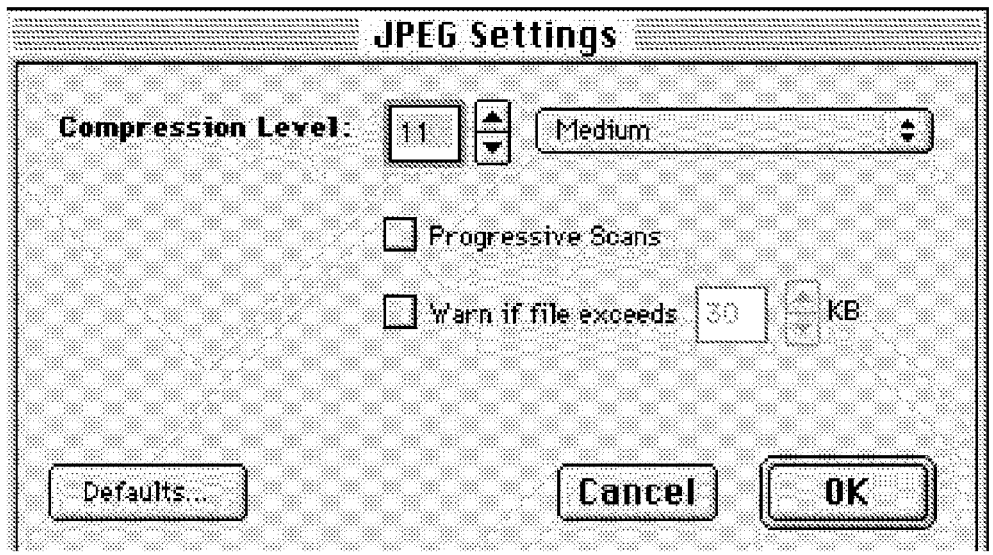

FIG. 3 shows a UI for selecting the desired degree of compression, which can be specified either as low, medium, or high, or by setting a numerical compression parameter. The UI of FIG. 3 also allows the user to request a warning if the compressed image file is larger than a specified size, and permits the user to specify progressive scans.

Figure 4:
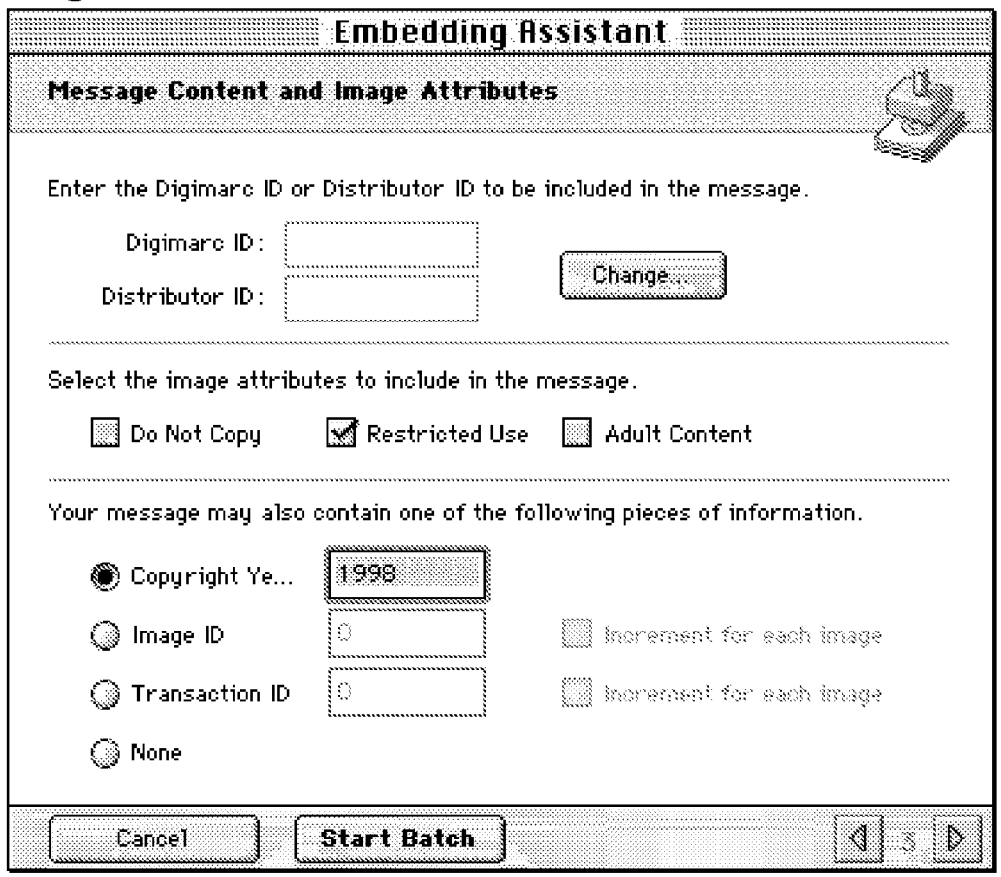

FIG. 4 shows a UI permitting the user to specify the watermark payload with which the images are to be encoded. Among the fields are Digimarc ID, Distributor ID, Do Not Copy flag, Restricted Use flag, Adult Content Flag, Copyright Year, Image ID, and Transaction ID. The UI also permits the user to specify that certain IDs are to be incremented for each successive image in the batch.

Figure 5:
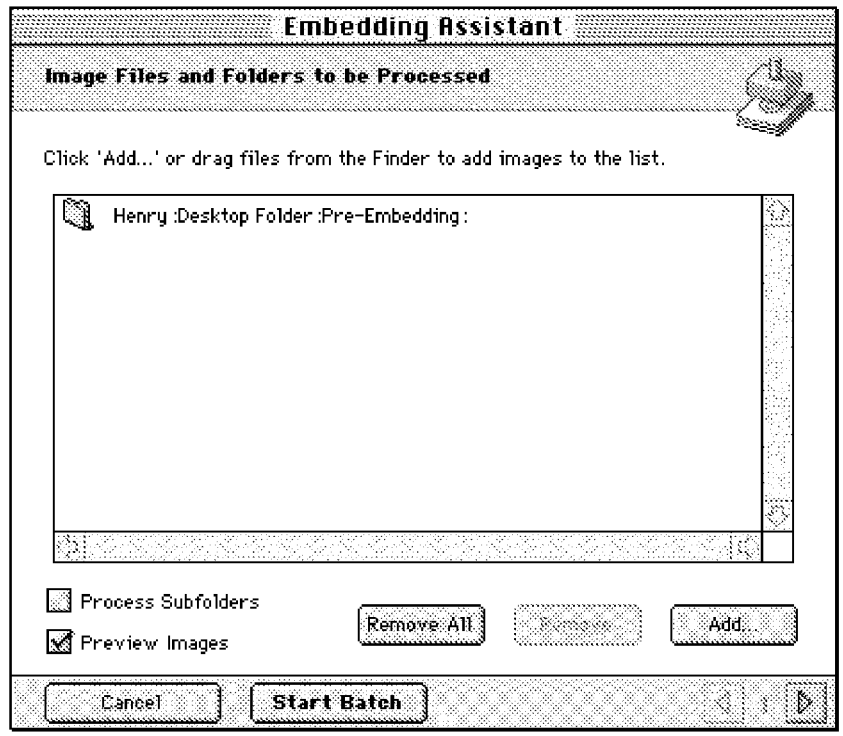

FIG. 5 shows a UI permitting the user to specify the location of images to be processed. The UI optionally allows the user to preview images as part of the process.

Figure 6:
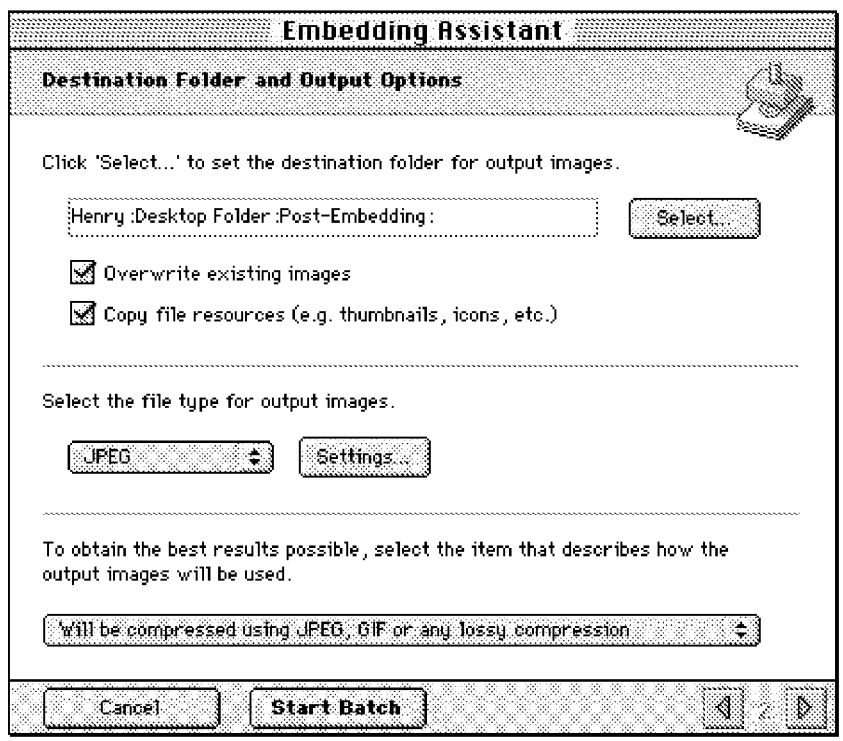

FIG. 6 shows a UI permitting the user to specify a destination folder for the watermarked images, and output options (e.g. file format).

Figure 7:
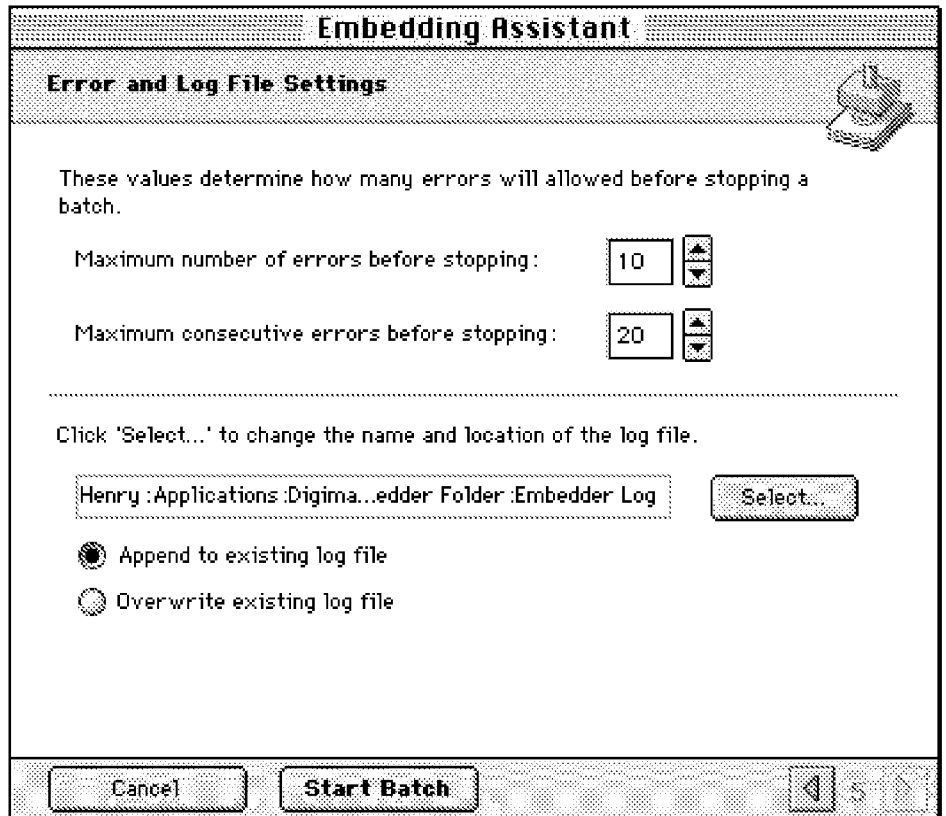

FIG. 7 shows a UI permitting the user to specify error and log file settings (e.g. specifying maximum number of errors before stopping, and maximum consecutive errors before stopping).

Figure 8:
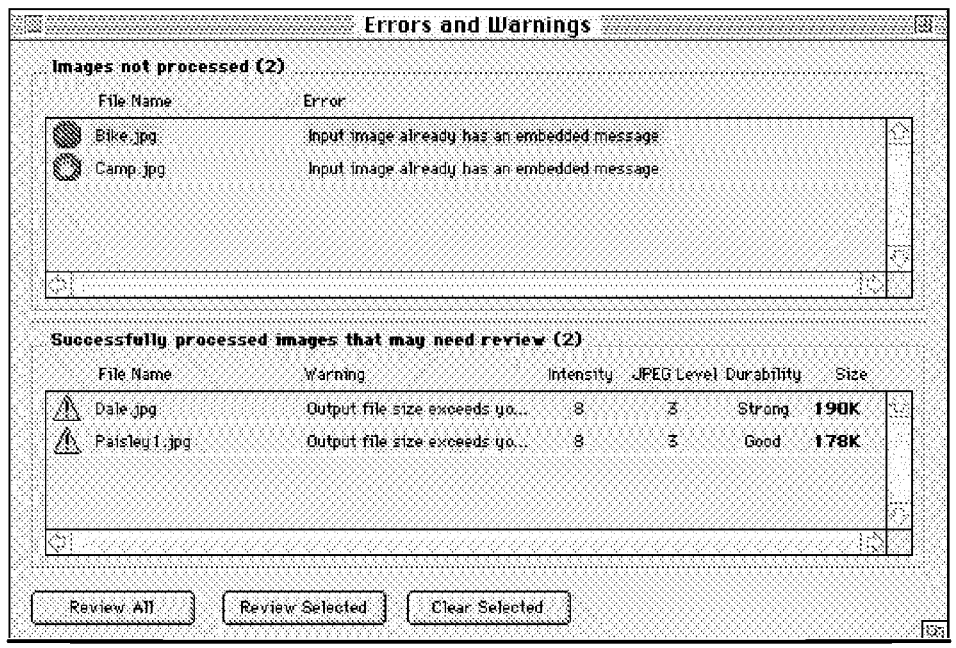

FIG. 8 shows a UI presenting errors and warnings to a user, e.g., after a batch of image files has been processed. Included with the error listings are files that were not processed (e.g. because they were found to already have a watermark). Included with the warning listings are files whose size, after compression, exceeded the earlier-specified maximum file size (FIG. 3). The UI also permits the user to review all or selected files.

Figure 9:
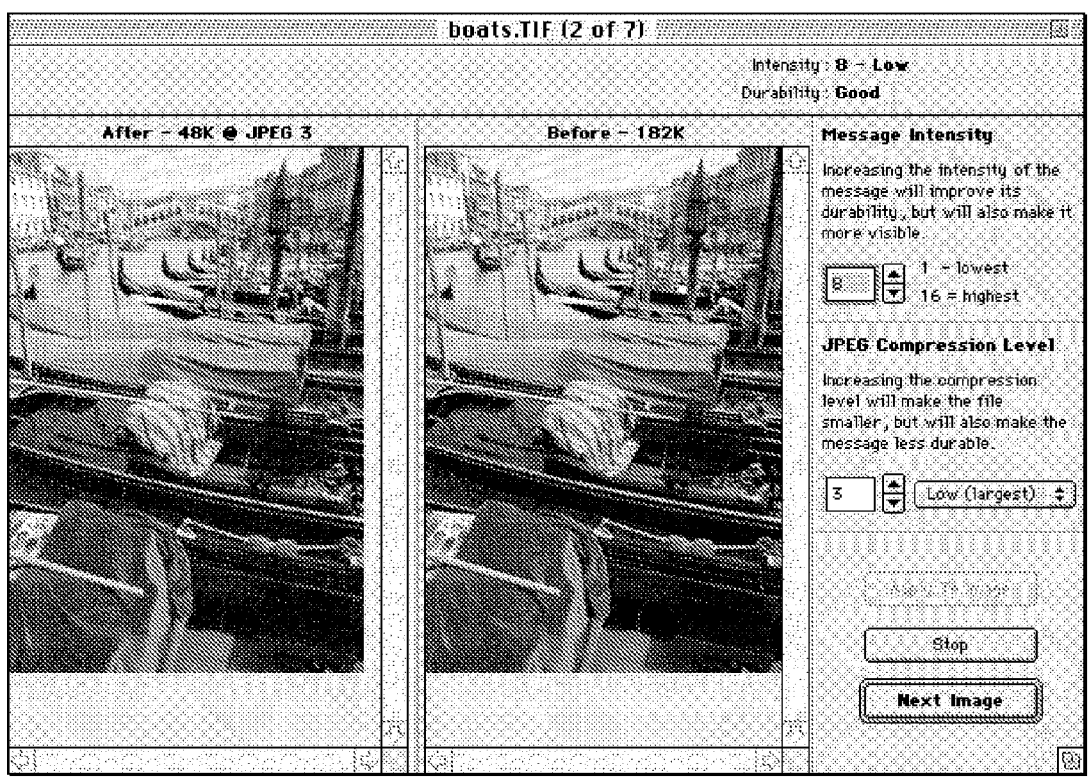
Figures 10, 11:
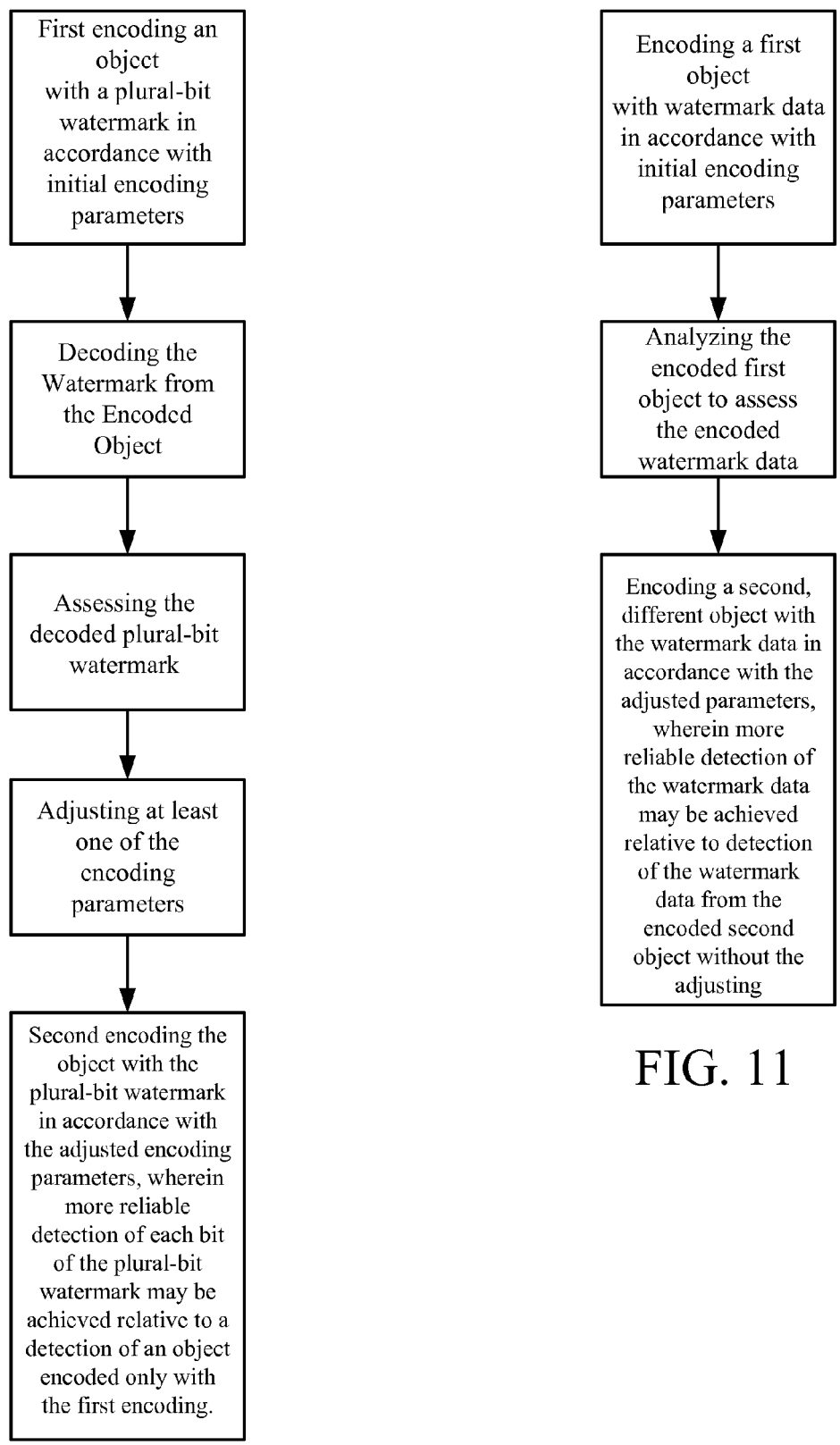
Figure 12:
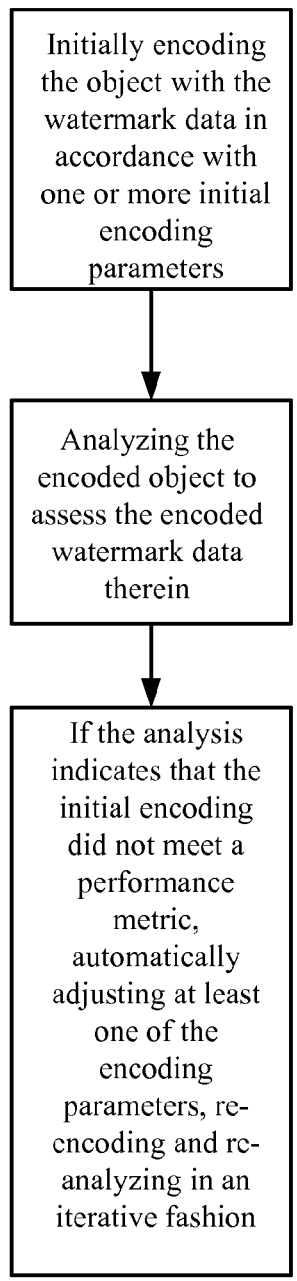
Figure 13:
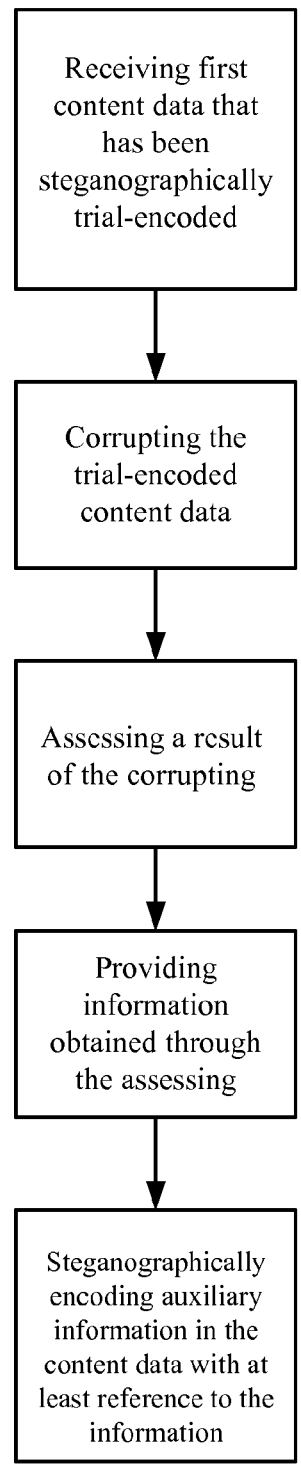

FIG. 9 shows a UI that presents an image for review, both after and before encoding/compression, and indicating the size of each image. The screen also includes UI controls permitting the user to adjust the intensity (on the 1 to 16 scale) and the JPEG compression level (either on a low/medium/high scale, or by numerical parameter). After the user has made any desired changes, the "Next Image" button permits the next image to be displayed and processed.

(Although the just-described arrangement adjusted the intensity until a threshold was reached, and only then adjusted compression, in other systems this need not be the case. For example, variations in intensity and compression might be alternated until a suitable result is achieved.)

While the just-discussed system checked robustness of the watermark against JPEG-distortion (i.e. a lossy compression/decompression process), the same procedure can be adapted to other types of expected distortion. For example, if an image is expected to be printed and then scanned, such distortion might be modeled by down-sampling and blur-filtering. The system can check trial encodings against such distortion, and adjust the intensity (or other parameter) as needed to provide a desired degree of durability against such corruption.

Likewise, while the just-discussed system checked trial encoding for two performance metrics (e.g., accurate decoding, and strength of watermark meeting a threshold), in other embodiments different performance metrics can be employed. Other sample metrics include, but are not limited to: speed of watermark decoding being within a threshold; change (i.e. increase or decrease) in bit-rate (e.g. for MPEG video or MP3/MP4 audio) being within a threshold; change in entropy (in the encoded vs. un-encoded object) being within a threshold, etc. (Changes in bit-rate and entropy resulting from watermarking are reviewed, e.g., in WO 99/10837.)

In addition to testing for watermark robustness after image compression/decompression, the just-described embodiment also included image compression as part of the batch processing. Of course, this step could be omitted, and/or other processing steps (e.g. filtering, cropping, format translation, etc.) desired by the user could be included.

Watermarking can be applied to myriad forms of information. These include imagery (including video) and audio—whether represented in digital form (e.g. an image comprised of pixels, digital or MPEG video, MP3/MP4 audio, etc.), or in an analog representation (e.g. non-sampled music, printed imagery, banknotes, etc.) Watermarking can be applied to digital content (e.g. imagery, audio) either before or after compression. Watermarking can also be used in various "description" or "synthesis" language representations of content, such as Structured Audio, Csound, NetSound, SNHC Audio and the like (c.f. http://sound.media.mit.edu/mpeg4/) by specifying synthesis commands that generate watermark data as well as the intended audio signal. Watermarking can also be applied to ordinary media, whether or not it conveys information. Examples include paper, plastics, laminates, paper/film emulsions, etc. A watermark can embed a single bit of information, or any number of bits.

The physical manifestation of watermarked information most commonly takes the form of altered signal values, such as slightly changed pixel values, picture luminance, picture colors, DCT coefficients, instantaneous audio amplitudes, etc. However, a watermark can also be manifested in other ways, such as changes in the surface micro-topology of a medium, localized chemical changes (e.g. in photographic emulsions), localized variations in optical density, localized changes in luminescence, etc. Watermarks can also be optically implemented in holograms and conventional paper watermarks.

One improvement to existing technology is to employ established web crawler services (e.g. AltaVista, Excite, or Inktomi) to search for watermarked content (on the Web, in internet news groups, BBS systems, on-line systems, etc.) in addition to their usual data collecting/indexing operations. Such crawlers can download files that may have embedded watermarks (e.g. *.JPG, *.WAV, etc.) for later analysis. These files can be processed, as described below, in real time. More commonly, such files are queued and processed by a computer distinct from the crawler computer. Instead of performing watermark-read operations on each such file, a screening technique can be employed to identify those most likely to be conveying watermark data. One such technique is to perform a DCT operation on an image, and look for spectral coefficients associated with certain watermarking techniques (e.g. coefficients associated with an inclined embedded subliminal grid). To decode spread-spectrum based watermarks, the analyzing computer requires access to the noise signal used to spread the data signal. In one embodiment, interested parties submit their noise/key signals to the crawler service so as to enable their marked content to be located. The crawler service maintains such information in confidence, and uses different noise signals in decoding an image (image is used herein as a convenient shorthand for imagery, video, and audio) until watermarked data is found (if present). This allows the use of web crawlers to locate content with privately-coded watermarks, instead of just publicly-coded watermarks, as is presently the case. The queuing of content data for analysis provides certain opportunities for computational shortcuts. For example, like-sized images (e.g. 256×256 pixels) can be tiled into a larger image, and examined as a unit for the presence of watermark data. If the decoding technique (or the optional pre-screening technique) employs a DCT transform or the like, the block size of the transform can be tailored to correspond to the tile size (or some integral fraction thereof). Blocks indicated as likely having watermarks can then be subjected to a full read operation. If the queued data is sorted by file name, file size, or checksum, duplicate files can be identified. Once such duplicates are identified, the analysis computer need consider only one instance of the file. If watermark data is decoded from such a file, the content provider can be informed of each URL at which copies of the file were found.

Some commentators have observed that web crawler-based searches for watermarked images can be defeated by breaking a watermarked image into sub-blocks (tiles). HTML instructions, or the like, cause the sub-blocks to be presented in tiled fashion, recreating the complete image. However, due to the small size of the component sub-blocks, watermark reading is not reliably accomplished.

This attack is overcome by instructing the web-crawler to collect the display instructions (e.g. HTML) by which image files are positioned for display on a web page, in addition to the image files themselves. Before files collected from a web page are scrutinized for watermarks, they can be concatenated in the arrangement specified by the display instructions. By this arrangement, the tiles are reassembled, and the watermark data can be reliably recovered.

Another such postulated attack against web crawler detection of image watermarks is to scramble the image (and thus the watermark) in a file, and employ a Java applet or the like to unscramble the image prior to viewing. Existing web crawlers inspect the file as they find it, so the watermark is not detected. However, just as the Java descrambling applet can be invoked when a user wishes access to a file, the same applet can similarly be employed in a web crawler to overcome such attempted circumvention of watermark detection.

Although "content" can be located and indexed by various web crawlers, the contents of the "content" are unknown. A *.JPG file, for example, may include pornography, a photo of a sunset, etc.

Watermarks can be used to indelibly associate meta-data within content (as opposed to stored in a data structure that forms another part of the object, as is conventionally done with meta-data). The watermark can include text saying "sunset" or the like. More compact information representations can alternatively be employed (e.g. coded references). Still further, the watermark can include (or consist entirely of) a Unique ID (UID) that serves as an index (key) into a network-connected remote database containing the meta data descriptors. The remote data may contain meta-data described by an extensible markup language (XML) tag set. By such arrangements, web crawlers and the like can extract and index the meta-data descriptor tags, allowing searches to be conducted based on semantic descriptions of the file contents, rather than just by file name.

Existing watermarks commonly embed information serving to communicate copyright information. Some systems embed text identifying the copyright holder. Others embed a UID which is used as an index into a database where the name of the copyright owner, and associated information, is stored.

Looking ahead, watermarks should serve more than as silent copyright notices. One option is to use watermarks to embed "intelligence" in content. One form of intelligence is knowing its "home." "Home" can be the URL of a site with which the content is associated. A photograph of a car, for example, can be watermarked with data identifying the web site of an auto-dealer that published the image. Wherever the image goes, it serves as a link back to the original disseminator. The same technique can be applied to corporate logos. Wherever they are copied on the internet, a suitably-equipped browser or the like can decode the data and link back to the corporation's home page. (Decoding may be effected by positioning the cursor over the logo and pressing the right-mouse button, which opens a window of options—one of which is Decode Watermark.)

To reduce the data load of the watermark, the intelligence need not be wholly encoded in the content's watermark. Instead, the watermark can again provide a UID—this time identifying a remote database record where the URL of the car dealer, etc., can be retrieved. In this manner, images and the like become marketing agents—linking consumers with vendors (with some visual salesmanship thrown in). In contrast to the copyright paradigm, in which dissemination of imagery was an evil sought to be tracked and stopped, dissemination of the imagery can now be treated as a selling opportunity. A watermarked image becomes a portal to a commercial transaction.

(Using an intermediate database between a watermarked content file and its ultimate home (i.e. indirect linking) serves an important advantage: it allows the disseminator to change the "home" simply by updating a record in the database. Thus, for example, if one company is acquired by another, the former company's smart images can be made to point to the new company's home web page by updating a database record. In contrast, if the old company's home URL is hard-coded (i.e. watermarked) in the object, it may point to a URL that eventually is abandoned. In this sense, the intermediate database serves as a switchboard that couples the file to its current home.

The foregoing techniques are not limited to digital content files. The same approach is equally applicable with printed imagery, etc. A printed catalog, for example, can include a picture illustrating a jacket. Embedded in the picture is watermarked data. This data can be extracted by a simple hand-scanner/decoder device using straightforward scanning and decoding techniques (e.g. those known to artisans in those fields). In watermark-reading applications employing hand-scanners and the like, it is important that the watermark decoder be robust to rotation of the image, since the catalog photo will likely be scanned off-axis. One option is to encode subliminal graticules (e.g. visualization synchronization codes) in the catalog photo so that the set of image data can be post-processed to restore it to proper alignment prior to decoding.

The scanner/decoder device can be coupled to a modem-equipped computer, a telephone, or any other communications device. In the former instance, the device provides URL data to the computer's web browser, linking the browser to the catalog vendor's order page. (The device need not include its own watermark decoder; this task can be performed by the computer.) The vendor's order page can detail the size and color options of the jacket, inventory availability, and solicit ordering instructions (credit card number, delivery options, etc.)—as is conventionally done with on-line merchants. Such a device connected to a telephone can dial the catalog vendor's toll-free automated order-taking telephone number (known, e.g., from data encoded in the watermark), and identify the jacket to the order center. Voice prompts can then solicit the customer's choice of size, color, and delivery options, which are input by Touch Tone instructions, or by voiced words (using known voice recognition software at the vendor facility).

In such applications, the watermark may be conceptualized as an invisible bar code employed in a purchase transaction. Here, as elsewhere, the watermark can serve as a seamless interface bridging the print and digital worlds Another way of providing content with intelligence is to use the watermark to provide Java or ActiveX code. The code can be embedded in the content, or can be stored remotely and linked to the content. When the watermarked object is activated, the code can be executed (either automatically, or at the option of the user). This code can perform virtually any function. One is to "phone home"—initiating a browser and linking to the object's home The object can then relay any manner of data to its home. This data can specify some attribute of the data, or its use. The code can also prevent accessing the underlying content until permission is received. An example is a digital movie that, when double-clicked, automatically executes a watermark-embedded Java applet which links through a browser to the movie's distributor. The user is then prompted to input a credit card number. After the number has been verified and a charge made, the applet releases the content of the file to the computer's viewer for viewing of the movie. Support for these operations is desirably provided via the computer's operating system, or plug-in software.

Similar functionality can be provided with an operating system to trigger special treatment of watermarked content, provided the operating system is aware of the content type (e.g. in an object-oriented file system, or in a file system that is "media aware"). One exemplary application is in the acquisition of content from external audio/image/video devices.

Such arrangements can also be used to collect user-provided demographic information when smart image content is accessed by the consumer of the content. The demographic information can be written to a remote database and can be used for market research, customization or personalization of information about the content provided to the consumer, sales opportunities, advertising, etc.

In audio and video and the like, watermarks can serve to convey related information, such as links to WWW fan sites, actor biographies, advertising for marketing tie-ins (T-shirts, CDs, concert tickets). In such applications, it is desirable (but not necessary) to display on the user interface (e.g. screen) a small logo to signal the presence of additional information. When the consumer selects the logo via some selection device (mouse, remote control button, etc.), the information is revealed to the consumer, who can then interact with it.

Much has been written (and patented) on the topic of asset rights management. Sample patent documents include U.S. Pat. Nos. 5,715,403, 5,638,443, 5,634,012, 5,629,980. Again, much of the technical work is memorialized in journal articles, which can be identified by searching for relevant company names and trademarks such as IBM's Cryptolope system, Portland Software's ZipLock system, the Rights Exchange service by Softbank Net Solutions, and the DigiBox system from InterTrust Technologies.

An exemplary asset management system makes content available (e.g. from a web server, or on a new computer's hard disk) in encrypted form. Associated with the encrypted content is data identifying the content (e.g. a preview) and data specifying various rights associated with the content. If a user wants to make fuller use of the content, the user provides a charge authorization (e.g. a credit card) to the distributor, who then provides a decryption key, allowing access to the content. (Such systems are often realized using object-based technology. In such systems, the content is commonly said to be distributed in a "secure container.")

Other asset management systems deliver content "in the clear"—not encrypted or in a secure container. Such arrangements are common, e.g., in enterprise asset management systems (as opposed, for example, to e-commerce applications where container-based approaches are prevalent).

Desirably, the content should be marked (personalized/serialized) so that any illicit use of the content can be tracked. This marking can be performed with watermarking, which assures that the mark travels with the content wherever—and in whatever form—it may go. The watermarking can be effected by the distributor—prior to dissemination of the (encrypted) object—such as by encoding a UID that is associated in a database with that particular container. When access is provided to the content (e.g. an access right is granted to a secure container, or non-encrypted content is made available to a user), the database record can be updated to reflect the purchaser/user, the purchase date, the rights granted, etc. An alternative is to include a watermark encoder in the software tool used to access the content (e.g. a decryption engine, for secure container-based systems). Such an encoder can embed watermark data in the content before it is provided to the user (e.g. before it is released from the container, in secure container systems). The embedded data can include a UID, as described above. This UID can be assigned by the distributor prior to disseminating the content/container. Alternatively, the UID can be a data string not known or created until access (or the right to access) has been granted. In addition to the UID, the watermark can include other data not known to the distributor, e.g. information specific to the time(s) and manner(s) of accessing the content.

In still other non-container-based systems, access rights can again be implemented realized with watermarks. Full resolution images, for example, can be freely available on the web. If a user wishes to incorporate the imagery into a web page or a magazine, the user can interrogate the imagery as to its terms and conditions of use. This may entail linking to a web site specified by the embedded watermark (directly, or through an intermediate database), which specifies the desired information. The user can then arrange the necessary payment, and use the image knowing that the necessary rights have been secured.

Tagging of image/video/audio assets at the time of their end-user distribution (e.g. from a managed content repository) need not consist exclusively of a UID. Other data can also be watermarked into the content, e.g. a serial number, the identity of the recipient, the date of distribution, etc. Additionally, the watermarked data can serve to establish a persistent link to meta-data contained in an associated asset management database.

As noted, digital watermarks can also be realized using conventional (e.g. paper) watermarking technologies. Known techniques for watermarking media (e.g. paper, plastic, polymer) are disclosed in U.S. Pat. Nos. 5,536,468, 5,275,870, 4,760,239, 4,256,652, 4,370,200, and 3,985,927 and can be adapted to display of a visual watermark instead of a logo or the like. Note that some forms of traditional watermarks which are designed to be viewed with transmissive light can also show up as low level signals in reflective light, as is typically used in scanners. Transmissive illumination detection systems can also be employed to detect such watermarks, using optoelectronic traditional-watermark detection technologies known in the art.

As also noted, digital watermarks can be realized as part of optical holograms. Known techniques for producing and securely mounting holograms are disclosed in U.S. Pat. Nos. 5,319,475, 5,694,229, 5,492,370, 5,483,363, 5,658,411 and 5,310,222. To watermark a hologram, the watermark can be represented in the image or data model from which the holographic diffraction grating is produced. In one embodiment, the hologram is produced as before, and displays an object or symbol. The watermark markings appear in the background of the image so that they can be detected from all viewing angles. In this context, it is not critical that the watermark representation be essentially imperceptible to the viewer. If desired, a fairly visible noise-like pattern can be used without impairing the use to which the hologram is put.

Digital watermarks can also be employed in conjunction with labels and tags. In addition to conventional label/tag printing processes, other techniques—tailored to security—can also be employed. Known techniques useful in producing security labels/tags are disclosed in U.S. Pat. Nos. 5,665,194, 5,732,979, 5,651,615, and 4,268,983. The imperceptibility of watermarked data, and the ease of machine decoding, are some of the benefits associated with watermarked tags/labels. Additionally, the cost is far less than many related technologies (e.g. holograms). Watermarks in this application can be used to authenticate the originality of a product label, either to the merchant or to the consumer of the associated product, using a simple scanner device, thereby reducing the rate of counterfeit product sales.

Conveniently ignoring for the time being the inevitable social ramifications of the following apparatus, consider a steganographic setup whereby a given computing system which is based on a "master clock" driving function can, with a small modification, impress a signal upon its electrical operations that could uniquely identify the computing system when that system communicates digitally with a second computing system. The slight modification referred to would be such that it would not interfere at all with the basic operation of the first computing system, nor interfere with the communications between the two systems.

The social ramifications referred to allude to the idea that there still exists the notion of pure anonymity within an internet context and the associated idea of the right to privacy. The "good" of this notion seems to be that non-anonymity can be the seed for exploitation, while the "bad" of this notion seems to be an illusory escape from responsibility for one's own actions. Be this as it all may, there still seems to be ground for the socially neutral concept of simply identifying a given physical object relative to its neighbors, hence the following approach to impressing a unique signal onto a computing system such that a second system in communication with the first can identify the first.

Using spread spectrum principles (e.g. where a "noise like" carrier signal is modulated by an information signal to yield a data signal), the instantaneous phase of a computer's clock signal is modulated to convey steganographically encoded data. In one embodiment, the phase of the clock frequency is instantaneously varied in accordance with the data signal. (In some embodiments, the data signal needn't reflect modulation with a noise-like carrier signal; the unaltered information signal can be sent.) In an illustrative system, the period of the clock signal is 3 nanoseconds, and the instantaneous phase shifting is on the order of +/−10 picoseconds. (These figures will, of course, depend on the particular microprocessor used, and its tolerance for phase noise while still performing within specification.) If a binary "1" is to be encoded, the phase is advanced 10 picoseconds. If a binary "0" is to be encoded, the phase is retarded 10 picoseconds. Successive clock edges are successively advanced or retarded in accordance with corresponding bits of the data signal until the end of data is reached. Then the data signal desirably repeats, so as to provide redundant encoding.

Such modulation of the computer's clock system will be manifested throughout its operation, including in its communication with connected devices. Thus, for example, a modem or network connection will convey data that is influenced by the phase modulation of the clock signal. In particular, the signal transitions in any such communication (e.g. RS-232, TCP/IP, wireless modem broadcasts, etc.) will not occur on uniformly-spaced clock edges, but instead will occur on clock edges whose exact temporal characteristics vary slightly in accordance with the data signal with which the clock has been modulated.

A remote computer that receives information sent by such a computer can examine the timing of the signal (e.g. its edge transitions), and discern thereby the encoded data signal.

If the channel to the remote computer offers near perfect temporal fidelity (i.e. it introduces essentially no variable delay into the data's propagation), the data can be extracted by simply noting the instantaneous offset of each edge transition from its expected nominal value, and a corresponding element of the data signal is thereby identified. If the data signal was modulated by a noise-like signal, demodulation with the same noise-like signal will provide the original information signal. (No such demodulation with a noise signal is required if the original information signal served as the basis for the clock phase shifting.)

More typically, the channel to the remote computer introduces temporal distortion. An example is the internet, where different packets may follow different routings between the originating computer and the receiving computer. In such environments, a large number of data must be collected and processed to extract the data signal. For example, it may be necessary to average, or otherwise process, thousands of edge transitions corresponding to a given bit in order to determine whether the edge was advanced or retarded, and thereby decode that bit with a high degree of statistical assurance. Thus, in environments with highly variable transmission latencies (e.g. the cited internet example), a message of 100 bits might require collection and processing of on the order of a million edge transitions to assure reliable message recovery. However, given the acceleration of data rates on the internet, this may require only a few seconds of data.

In an illustrative embodiment, the master clock of the computer is controlled by a phase locked loop (PLL) circuit configured as a phase modulator and driven by the data signal. Decoding is performed by another PLL circuit, configured as a phase demodulator. (The two PLLs needn't share a common time base, since decoding can proceed by examining deviations of instantaneous edge transitions from the average clock period.) The design of such PLL phase modulators and demodulators is within the routine capabilities of an artisan in this field.

Of course, the artisan will recognize that implementations not employing PLLs can readily be devised (e.g. employing other known phase shifting/modulating techniques, delay circuits, etc.)

To provide a comprehensive disclosure without unduly lengthening this specification, applicant incorporates by reference the disclosures of the patents, laid-open international applications, and commonly-owned U.S. applications cited herein.

Having described and illustrated a number of improvements to the field of digital watermarking in particular contexts, it will be recognized that the invention is not so limited. Instead, we claim as our invention all such embodiments as come within the scope and spirit of the following claims, and equivalents thereto.

We claim:

1. A method comprising:
   encoding, using an electronic processor, content with a plural-bit digital watermark in accordance with initial encoding parameters to yield an encoded content;
   transforming the encoded content to yield a transformed encoded content;
   reverse transforming the transformed encoded content to yield a reverse transformed encoded content;
   determining an assessment of the encoded plural-bit digital watermark in each of two or more portions of the reverse transformed encoded content;
   for each of the two or more portions of the content, adjusting at least one of the initial encoding parameters according to the assessment for a respective portion of the content; and
   encoding the content with the plural-bit watermark in accordance with the at least one adjusted encoding parameter.

2. The method of claim 1, wherein each of the portions of the content comprises two or more bits of the plural-bit digital watermark.

3. The method of claim 1, wherein the content comprises audio or video.

4. The method of claim 1, wherein the assessment comprises a signal to noise ratio.

5. The method of claim 1, wherein the assessment corresponds to a robustness of a portion of the digital watermark encoded in a respective portion of the content.

6. The method of claim 5, wherein the robustness corresponds to two or more bits of the plural-bit digital watermark.

7. The method of claim 1, wherein the assessment corresponds to an encoding strength or signal strength.

8. The method of claim 1, wherein the two or more portions each comprises transform domain values or coefficients.

9. A non-transitory computer readable medium comprising instructions stored thereon to cause an electronic processor to perform the method of claim 1.

10. A non-transitory computer readable medium comprising instructions stored thereon to cause an electronic processor to perform the method of claim 5.

11. A non-transitory computer readable medium comprising instructions stored thereon to cause an electronic processor to perform the method of claim 6.

12. An electronic apparatus programmed to perform the method of claim 1.

13. An electronic apparatus programmed to perform the method of claim 5.

14. An electronic apparatus programmed to perform the method of claim 6.

15. A method comprising:
   obtaining a first content item from a batch of N content items, where N comprises an integer;
   embedding, using an electronic processor, watermark information in the first content item to yield a watermarked first content item;
   transforming the watermarked first content item, yielding a transformed watermarked first content item;
   reverse transforming the transformed watermarked first content item to yield a reverse transformed watermarked first content item;
   determining one or more parameters based on the reverse transformed watermarked first content item;
   utilizing the one or more parameters to inform a subsequent embedding process; and
   embedding watermarks in the second to N content items with the informed subsequent embedding process.

16. The method of claim 15, wherein the N content items comprise audio or video.

17. The method of claim 15, wherein the watermarks comprise plural-bit data.

18. The method of claim 15, wherein the act of transforming comprises compression.

19. The method of claim 15, wherein the one or more parameters correspond to signal intensity.

20. The method of claim 15, wherein the N content items comprise audio-visual works.

21. A non-transitory computer readable medium comprising instructions stored thereon to cause an electronic processor to perform the method of claim 15.

22. A non-transitory computer readable medium comprising instructions stored thereon to cause an electronic processor to perform the method of claim 19.

23. An electronic apparatus programmed to perform the method of claim 15.

24. An electronic apparatus programmed to perform the method of claim 19.

25. A method comprising:
   obtaining data corresponding to user input, the user input relating to data transformation;
   encoding, using an electronic processor, information in content to yield an encoded content;
   transforming the encoded content with reference to at least the data to yield a transformed encoded content;
   reverse transforming the transformed encoded content to yield a reverse transformed encoded content;
   analyzing the reverse transformed encoded content; and
   based at least in part on the analyzing, determining whether to encode the information in the content under different encoding conditions.

26. The method of claim 25, wherein the content comprises audio or video.

27. The method of claim 25, wherein the information comprises plural-bits.

28. The method of claim 25, wherein the user input indicates a relative level of transformation.

29. The method of claim 25, wherein the act of analyzing determines a relative strength of the encoding within the content.

30. The method of claim 25, wherein the act of encoding acts upon transform domain coefficients.

* * * * *

UNITED STATES PATENT AND TRADEMARK OFFICE
CERTIFICATE OF CORRECTION

| | | |
|---|---|---|
| PATENT NO. | : 8,483,426 B2 | |
| APPLICATION NO. | : 12/881911 | |
| DATED | : July 9, 2013 | |
| INVENTOR(S) | : Rhoads et al. | |

It is certified that error appears in the above-identified patent and that said Letters Patent is hereby corrected as shown below:

On the Title Page, under "Related U.S. Application Data", in Column 1, Line 1, delete item "(60) Continuation" and insert item -- (63) Continuation --, therefor.

In the Drawings

In Fig. 14, Sheet 8 of 8, in Box 1, in Line 5, delete "trail-encoded" and insert -- trial-encoded --, therefor.

In the Specification

In Column 2, Lines 2-3, delete "can by" and insert -- can be --, therefor.

In Column 9, Line 17, delete "worlds" and insert -- worlds. --, therefor.

In Column 9, Line 25, delete "home The" and insert -- home. The --, therefor.

Signed and Sealed this
Eighth Day of July, 2014

Michelle K. Lee
*Deputy Director of the United States Patent and Trademark Office*